(12) United States Patent
Luo et al.

(10) Patent No.: US 11,687,055 B2
(45) Date of Patent: Jun. 27, 2023

(54) SERVO CONTROL DEVICE, SERVO CONTROL SYSTEM, AND SERVO CONTROL METHOD

(71) Applicant: FANUC CORPORATION, Yamanashi (JP)

(72) Inventors: Wei Luo, Yamanashi (JP); Satoshi Ikai, Yamanashi (JP); Tsutomu Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 408 days.

(21) Appl. No.: 16/992,607

(22) Filed: Aug. 13, 2020

(65) Prior Publication Data
US 2021/0080921 A1    Mar. 18, 2021

(30) Foreign Application Priority Data
Sep. 12, 2019   (JP) .............................. JP2019-165895

(51) Int. Cl.
G05B 19/402    (2006.01)
G06F 11/30     (2006.01)

(52) U.S. Cl.
CPC ............ *G05B 19/402* (2013.01); *G06F 11/30* (2013.01); *G05B 2219/35519* (2013.01)

(58) Field of Classification Search
CPC ..... G06F 11/30; G06F 1/3203; G05B 19/402; G05B 2219/35519
See application file for complete search history.

(56) References Cited

U.S. PATENT DOCUMENTS

| 6,085,215 A * | 7/2000 | Ramakrishnan ...... G06F 9/4887 |
| | | 718/102 |
| 2020/0110687 A1* | 4/2020 | Hu ....................... G06F 11/3013 |

FOREIGN PATENT DOCUMENTS

| DE | 10110444 A1 * | 9/2002 | .......... G06F 11/3419 |
| JP | H05324418 A * | 12/1993 | .............. G06F 11/34 |

(Continued)

*Primary Examiner* — Ronald D Hartman, Jr.
(74) *Attorney, Agent, or Firm* — Wenderoth Lind & Ponack, L.L.P.

(57) ABSTRACT

The present disclosure is intended to enable a user to grasp a state of load on an arithmetic processing unit (100, 200) so that the user can stop an excessive function of the arithmetic processing unit (100, 200), or can transfer part of arithmetic processes to another arithmetic processing unit (100, 200) with a small load. Included are the arithmetic processing unit (100, 200) that executes a plurality of processes related to servo control processing; and an observation unit (300) that determines at least one of point-of-time information about start of each of the processes executed by the arithmetic processing unit or point-of-time information about end of each of the processes executed by the arithmetic processing unit; and an output unit (400) that calculates information about usage of the arithmetic processing unit based on the point-of-time information determined by the observation unit, and outputs the calculated information. The information about the usage is constituted by, for example, a processing time period during which the processes are executed by the arithmetic processing unit, a difference between a given processing time period and the processing time period during which the processes are executed, a ratio of the processing time period during which the processes are executed to the given processing time period, or a ratio of the difference to the given processing time period.

7 Claims, 9 Drawing Sheets

(56) References Cited

FOREIGN PATENT DOCUMENTS

| | | | | |
|---|---|---|---|---|
| JP | H1011333 A | * | 1/1998 | ............... G06F 11/34 |
| JP | 2000276381 A | * | 10/2000 | ........... G06F 11/3457 |
| JP | 2004171485 A | * | 6/2004 | ............... G06F 11/34 |
| JP | 2006-12221 | | 1/2006 | |
| JP | 2009-289131 | | 12/2009 | |
| JP | 2019-61467 | | 4/2019 | |
| JP | 2019-79336 | | 5/2019 | |
| WO | WO-0008806 A1 | * | 2/2000 | .............. H04L 29/06 |

* cited by examiner

SERVO CONTROL DEVICE, SERVO CONTROL SYSTEM, AND SERVO CONTROL METHOD

This application is based on and claims the benefit of priority from Japanese Patent Application No. 2019-165895, filed on 12 Sep. 2019, the content of which is incorporated herein by reference.

BACKGROUND OF THE INVENTION

Field of the Invention

The present invention relates to a servo control device, a servo control system, and a servo control method that are configured to execute a plurality of processes related to servo control processing, using an arithmetic processing device.

Related Art

As a technique related to the present invention, a numerical control device that executes a plurality of processes using an arithmetic processing device is disclosed in Patent Documents 1 and 2. The numerical control device disclosed in Patent Document 1 includes: a memory management unit that expands a program to be executed by a task on a memory; an execution time period calculation unit that calculates an execution time period of the task; an execution condition setting unit that sets execution conditions of the task based on execution results of the memory management unit and the execution time period calculation unit; a task monitoring unit that monitors a state of arithmetic units and determines an arithmetic unit to be assigned with the task; and a task control unit that registers and starts the task in the arithmetic unit assigned with the task based on the execution conditions. Patent Document 1 discloses that these components are implemented by a CPU as an arithmetic processing device executing programs stored in a memory device.

The numerical control device disclosed in Patent Document 2 has a multi-core processor for controlling a machine tool by executing a machining program. This numerical control device includes: a means for estimating a movement command generation-processing time period, the movement command generation-processing time period being required for generating a movement command to be executed in a predetermined cycle based on a machining command acquired from the machining program; and a means for dividing a movement command generating process, the means divides the movement command generating process, by which the movement command is generated, to the cores of the multi-core processor, based on the movement command generation-processing time period estimated by the means for estimating the movement command generation-processing time period. Provision of these means can improve the movement command generating process in processing performance, and makes it possible to meet a demand for a multi-axis and multi-path machine tool with greater functionality.

Patent Document 1: Japanese Unexamined Patent Application, Publication No. 2019-079336

Patent Document 2: Japanese Unexamined Patent Application, Publication No. 2006-012221

SUMMARY OF THE INVENTION

A servo control device includes an arithmetic processing unit such as a DSP, in order to achieve high-speed and high-precision servo control. Since the servo control device is required to provide real-time control, it is generally desirable to assign priorities to each of processing tasks and to schedule the processing tasks such that a processing task with higher priority can cause an interrupt so as to be executed. When combinations of functions to be executed in the servo control device are allocated to arithmetic processing devices of the servo control device, the allocations can be easily estimated if it is possible to grasp a processing margin of the arithmetic processing devices. On the other hand, as a consequence of maintenance or continuous development of a system, processes and functions are added to the system. Such addition results in an increase in the time period required for the processes, makes it difficult to grasp the time period required for the processes and the relationship between the processes, and complicates the schedule management, thereby giving rise to a problem of a decrease in productivity. For this reason, there has been a demand for a servo control device that allows a user to grasp a state of load on arithmetic processing units of the servo control device. It is desirable that using such a servo control device, the user can stop an excessive function of the arithmetic processing unit, or can transfer part of the arithmetic processes to another arithmetic processing unit with a small load so as to improve the stability and efficiency of the servo control device.

A first aspect of the present disclosure is directed to a servo control device including: an arithmetic processing unit that executes a plurality of processes related to servo control processing; an observation unit that determines at least one of point-of-time information about start of each of the processes executed by the arithmetic processing unit or point-of-time information about end of each of the processes executed by the arithmetic processing unit; and an output unit that calculates information about usage of the arithmetic processing unit based on the point-of-time information determined by the observation unit, and outputs the calculated information.

A second aspect of the present disclosure is directed to a servo control system including: servo control devices each including an arithmetic processing unit that executes a plurality of processes related to servo control processing, and an observation unit that determines at least one of point-of-time information about start of each of the processes executed by the arithmetic processing unit or point-of-time information about end of each of the processes executed by the arithmetic processing unit; and output devices each calculating information about usage of the arithmetic processing unit based on the point-of-time information determined by the observation unit, and each outputting the calculated information.

A third aspect of the present disclosure is directed to a servo control method of servo control devices each including an arithmetic processing unit that executes a plurality of processes related to servo control processing. The servo control method includes: determining at least one of point-of-time information about start of each of the plurality of processes or point-of-time information about end of each of the plurality of processes; calculating information about usage of the arithmetic processing unit based on the determined point-of-time information; and outputting the calculated information.

According to the aspects of the present disclosure, a user can grasp a state of load on the arithmetic processing unit. As a result, the user can stop an excessive function of the arithmetic processing unit, or can transfer part of the arithmetic processes to another arithmetic processing unit with a small load, thereby improving the stability and efficiency of the servo control device.

DETAILED DESCRIPTION OF THE INVENTION

Embodiments of the present disclosure will be described with reference to the drawings.

Figure 1:
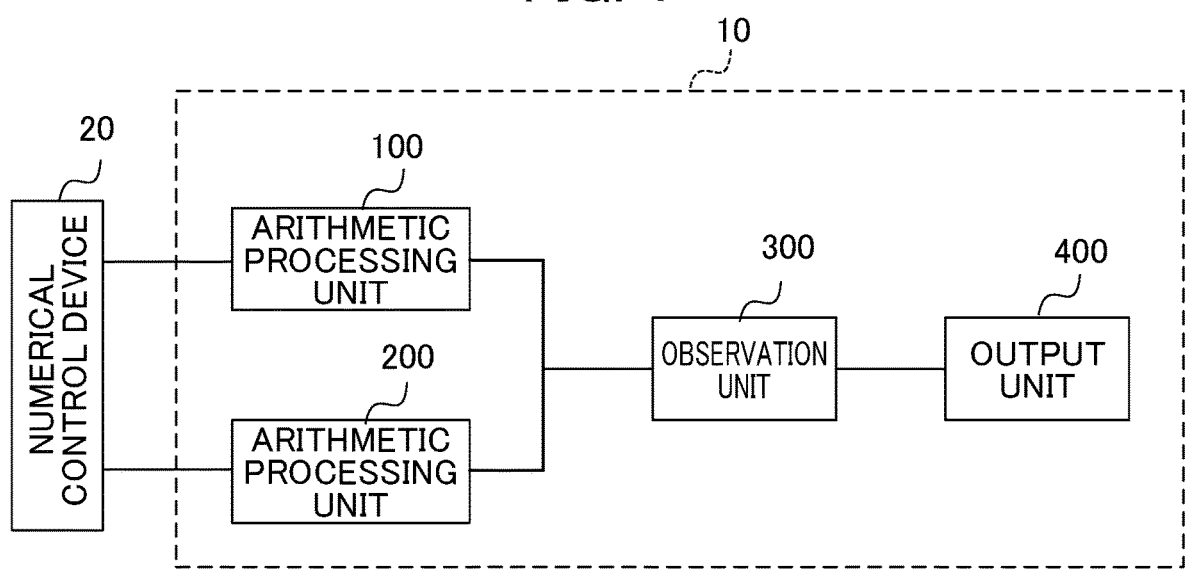
FIG. 1 is a block diagram showing a servo control device and a numerical control device according to an embodiment of the present disclosure.

FIG. 1 is a block diagram showing a servo control device and a numerical control device according to an embodiment of the present disclosure. As shown in FIG. 1, the servo control device 10 includes two arithmetic processing units (i.e., a first arithmetic processing unit 100, a second arithmetic processing unit 200), an observation unit 300, and an output unit 400. The first and second arithmetic processing units 100, 200 are connected to the numerical control device 20. The first and second arithmetic processing units 100, 200 are each constituted by a digital signal processor (DSP). The first and second arithmetic processing units 100, 200 are not limited to the DSP, but may be constituted by a micro processing unit (MPU), a computing unit of a different type, or a combination of an MPU and a DSP. The number of the arithmetic processing units is not particularly limited, and may be one or three or more.

The first arithmetic processing unit 100 and the second arithmetic processing unit 200 servo-control a plurality of motors. The number of motors to be controlled by each of the first arithmetic processing unit 100 and the second arithmetic processing unit 200 is set as appropriate. For example, when the first and second arithmetic processing units 100, 200 servo-control eight motors in total, the first and second arithmetic processing units 100, 200 each can control four motors. It is also possible that the first and second arithmetic processing units 100, 200 servo-control three motors and five motors, respectively. The plurality of motors are provided as part of a machine tool, a robot, an industrial machine, etc. The servo control device 10 may be provided as part of a machine such as a machine tool, a robot, an industrial machine, etc. For example, when the servo control device 10 drives a 5-axis machine tool, the first arithmetic processing unit 100 can servo-control three motors that drive three axes, namely, an X-axis, a Y-axis, and a Z-axis, while the second arithmetic processing unit 200 can servo-control two motors that drive a rotation axis and an inclining axis. Each motor may be a motor that performs rotary motion, or a linear motor that performs linear motion. In the following, the servo control device 10 is described on the assumption that it controls motors of a machine tool.

The observation unit 300 determines a point of time of start of each of a plurality of processes of servo control that are executed by the first and second arithmetic processing units 100, 200, and a point of time of end of each of the plurality of processes.

The observation unit 300 outputs point-of-time information about the start and end of each of the plurality of processes. Based on the point-of-time information outputted from the observation unit 300, the output unit 400 calculates and outputs information about usage of the first arithmetic processing unit 100 and usage of the second arithmetic processing unit 200 (hereinafter, referred to as the usage information). For example, the usage information is constituted by: a processing time period T during which the processes are executed; a margin time period $\Delta T$ with respect to a given processing time period T0 ($\Delta T = T0 - T$; a difference between the given processing time period and the processing time period during which the processes are executed); a usage ratio $T/T0$ of the processing time period (the ratio of the processing time period during which the processes are executed, to the given processing time period); or a ratio $\Delta T/T0$ of the margin time period. In order to output the usage information, the output unit 400 has, for example, a display unit such as a liquid crystal display device, or a communication unit which is connected to the Internet or a dedicated communication line, and via which the usage information is outputted to an external device.

The output unit 400 may issue an alarm when the processing time period T during which the processes are executed has approached the given processing time period T0.

The numerical control device 20 analyzes a machining program, generates movement command data for commanding the axes to move on the basis of the analysis results, and interpolates points on a command path in an interpolation cycle on the basis of a movement command given by the movement command data, so as to create interpolation data. The numerical control device 20 then performs, based on the interpolation data, an acceleration/deceleration process to compute a machining speed of each of the axes per interpolation cycle, and outputs the machining speeds to the first arithmetic processing unit 100 and the second arithmetic processing unit 200 of the servo control device 10.

Each component of the servo control device 10 will be described further in detail. Since the second arithmetic processing unit 200 has the same configuration as that of the first arithmetic processing unit 100, description of the second arithmetic processing unit 200 will be omitted.

<First Arithmetic Processing Unit 100>

Figure 2:
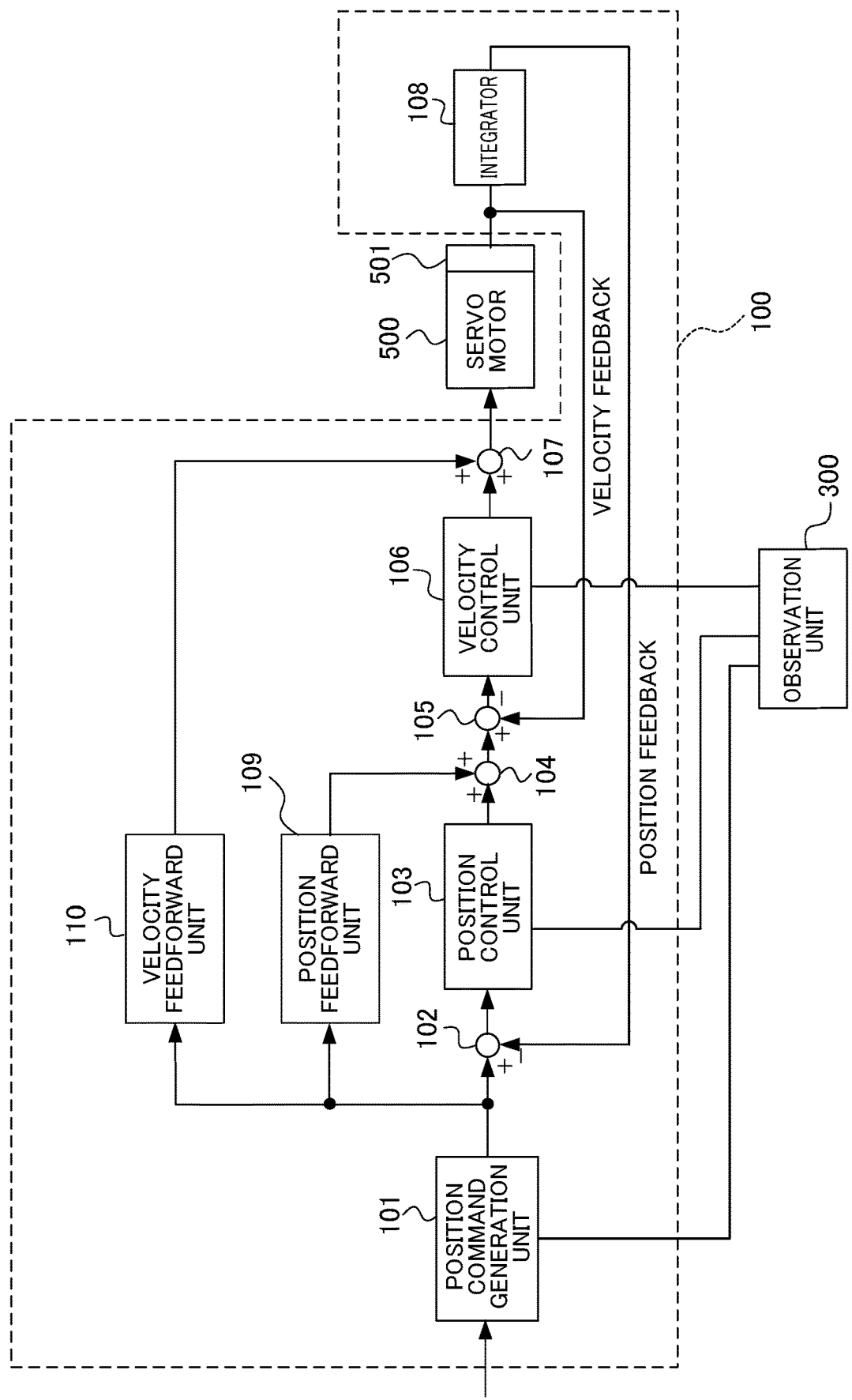
FIG. 2 is a block diagram showing a function of a first arithmetic processing unit that controls one motor.

FIG. 2 is a block diagram showing a function of the first arithmetic processing unit 100 that controls one motor. While the first arithmetic processing unit 100 is configured to control a plurality of motors, FIG. 2 shows components for controlling one of the motors. The processes for servo control are executed independently for each of the motors, and the components shown in FIG. 2 operate in association with each motor. The first arithmetic processing unit 100 includes a position command generation unit 101, a subtractor 102, a position control unit 103, an adder 104, a subtractor 105, a velocity control unit 106, an adder 107, an integrator 108, a position feedforward unit 109, and a velocity feedforward unit 110. The position control unit 103 functions as a velocity command generation unit, whereas the velocity control unit 106 functions as a current command generation unit. The first arithmetic processing unit 100 controls a servo motor 500. A rotary encoder 501 is provided in correspondence with the servo motor 500.

The position command generation unit 101 uses machining speeds of the axes outputted from the numerical control device 20 to generate a position command to change pulse frequency in order to change the speed of the servo motor 500. The position command is outputted to the subtractor 102, the position feedforward unit 109, and the velocity feedforward unit 110. The position command generation unit 101 may be provided in the numerical control device 20. In this case, the position command generation unit 101 functions as part of the servo control device.

The subtractor 102 determines a difference between the position command and a detected position subjected to position feedback (position FB) (which serves as position feedback information), and outputs the determined difference as a position deviation to the position control unit 103.

The position control unit 103 multiplies the position deviation by a position gain Kp, and outputs the calculated value as a velocity command to the adder 104.

The adder 104 adds the velocity command to an output value (position feedforward term) from the position feedforward unit 109, and outputs the sum as a feedforward-controlled velocity command to the subtractor 105. The subtractor 105 determines a difference between the output from the adder 104 and a velocity detection value subjected to the velocity feedback, and outputs the difference as a velocity deviation to the velocity control unit 106.

The velocity control unit 106 adds an integral determined by multiplying the velocity deviation by an integration gain K1v, to a value determined by multiplying the velocity deviation by a proportional gain K2v, and outputs the sum as a current command to the adder 107. The adder 107 adds the current command to an output value (velocity feedforward term) from the velocity feedforward unit 110, and outputs the sum as a feedforward-controlled current command to the servo motor 500. The integrator 108 integrates the velocity detection value outputted from the rotary encoder 501, and outputs a position detection value.

The position feedforward unit 109 differentiates the position command and multiplies the differential value by a constant α, and multiplies the product by a position feedforward coefficient. The position feedforward unit 109 outputs the thus determined value as a position feedforward term to the adder 104. The velocity feedforward unit 110 differentiates the position command twice, multiplies the differential by a constant β, and multiplies the product by a velocity feedforward coefficient. The velocity feedforward unit 110 then outputs the thus determined value as a velocity feedforward term to the adder 107. The rotary encoder 501 outputs the velocity detection value as velocity feedback information to the subtractor 105. The integrator 108 determines the position detection value from the velocity detection value, and outputs the position detection value as position feedback (position FB) information to the subtractor 102.

Figure 3:
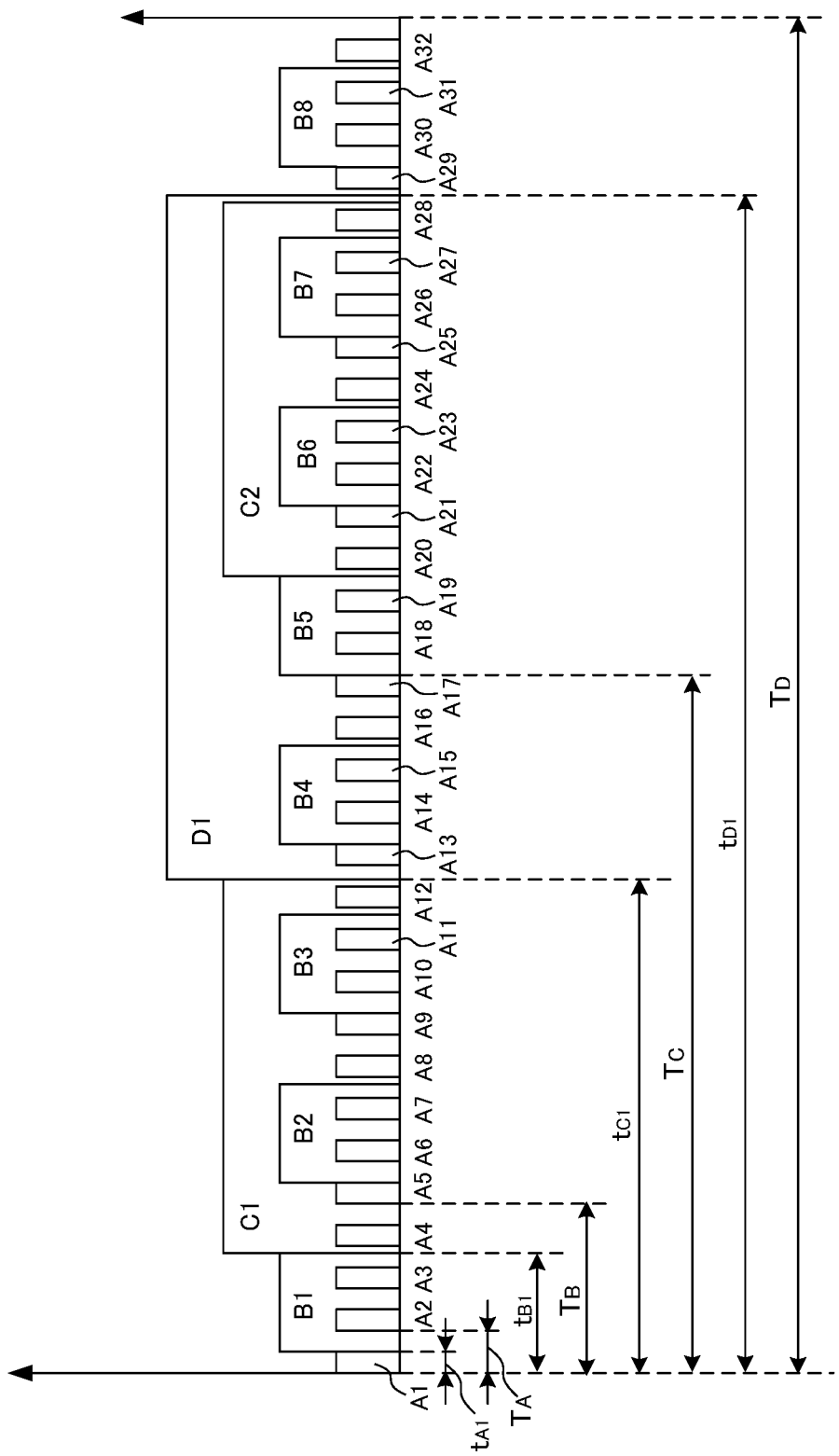
FIG. 3 shows, as an example, servo control processes executed by the first arithmetic processing unit.

FIG. 3 is a diagram showing, as an example, servo control processes executed by the first arithmetic processing unit 100. In FIG. 3, each process An, each process Bn, each process Cn, and each process Dn (where n is a natural number) are processes of the servo control. The process An, the process Bn, the process Cn, and the process Dn correspond to, for example, the process of the velocity control unit 106 generating the current command, the process of the position control unit 103 generating the velocity command, the process of the position command generation unit 101 generating the position command, and the process of the position command generation unit 101 communicating with the numerical control device 20, respectively.

In FIG. 3, $t_{A1}$ indicates an actual processing time period of the process A1, $t_{B1}$ indicates an actual processing time period of the process B1, $t_{C1}$ indicates an actual processing time period of the process C1, and $t_{D1}$ indicates an actual processing time period of the process D1. $T_A$ indicates a control cycle of the process An, $T_B$ indicates a control cycle of the process Bn, $T_C$ indicates a control cycle of the process Cn, and $T_D$ indicates a control cycle of the process Dn.

When the process An is the process of generating the current command, the control cycle $T_A$ is about several tens of microseconds per cycle. When the process Bn is the process of generating the velocity command, the control cycle $T_B$ is about several hundreds of microseconds per cycle to about several milliseconds per cycle. When the process Cn is the process of generating the position command, the control cycle $T_C$ is about several milliseconds per cycle. When the process Dn is the process of communicating with the numeric control device, the control cycle $T_D$ is about several tens of milliseconds per cycle.

The control cycles of the processes An, Bn, Cn and Dn (wherein n is a natural number) are in the relationship represented as (control cycle $T_A$ of process An)<(control cycle $T_B$ of process Bn)<(control cycle $T_C$ of process Cn)< (control cycle $T_D$ of process Dn). The shorter the control cycle is, the higher the priority is. Thus, the process An has the highest priority. One process An is executed in the control cycle $T_A$, one process Bn is executed in the control cycle $T_B$, one process Cn is executed in the control cycle $T_C$, and one process Dn is executed in the control cycle $T_D$. The order of priority of the processes are scheduled such that all the processes An, Bn, Cn, and Dn are completed within a certain time period.

As shown in FIG. 3, for example, the timing at which the process B1 is started coincides with the timing at which the process A1 ends. Further, in the example shown in FIG. 3, during the period for execution of the process B1, when the process A2 is started, the process B1 is interrupted and suspended until the process A2 is completed, and when the process A3 is started, the process B1 is interrupted and suspended until the process A3 is completed. Thus, the processes A2 and A3 cause interrupts to the process B1.

In the example shown in FIG. 3, during the period for execution of the process C1, the processes A4, A5, A8, A9, and A12 cause interrupts to the process C1. Further, the processes A6 and A7 cause interrupts to the process B2, and the processes A10 and A11 cause interrupts to the process B3. Furthermore, the processes B2 and B3 cause interrupts to the process C1.

In the example shown in FIG. 3, during the period for execution of the process D1, the processes A13, A16, and A17 cause interrupts to the process D1. Further, the processes A14 and A15 cause interrupts to the process B4, and the processes A18 and A19 cause interrupts to the process B5. The processes A22 and A23 cause interrupts to the process B6, and the processes A26 and A27 cause interrupts to the process B7. Furthermore, the processes B4 and B5 cause interrupts to the process D1, the processes B6 and B7 cause interrupts to the process C2, and the process C2 causes an interrupt to the process D1.

<Observation Unit 300>

Figure 4:
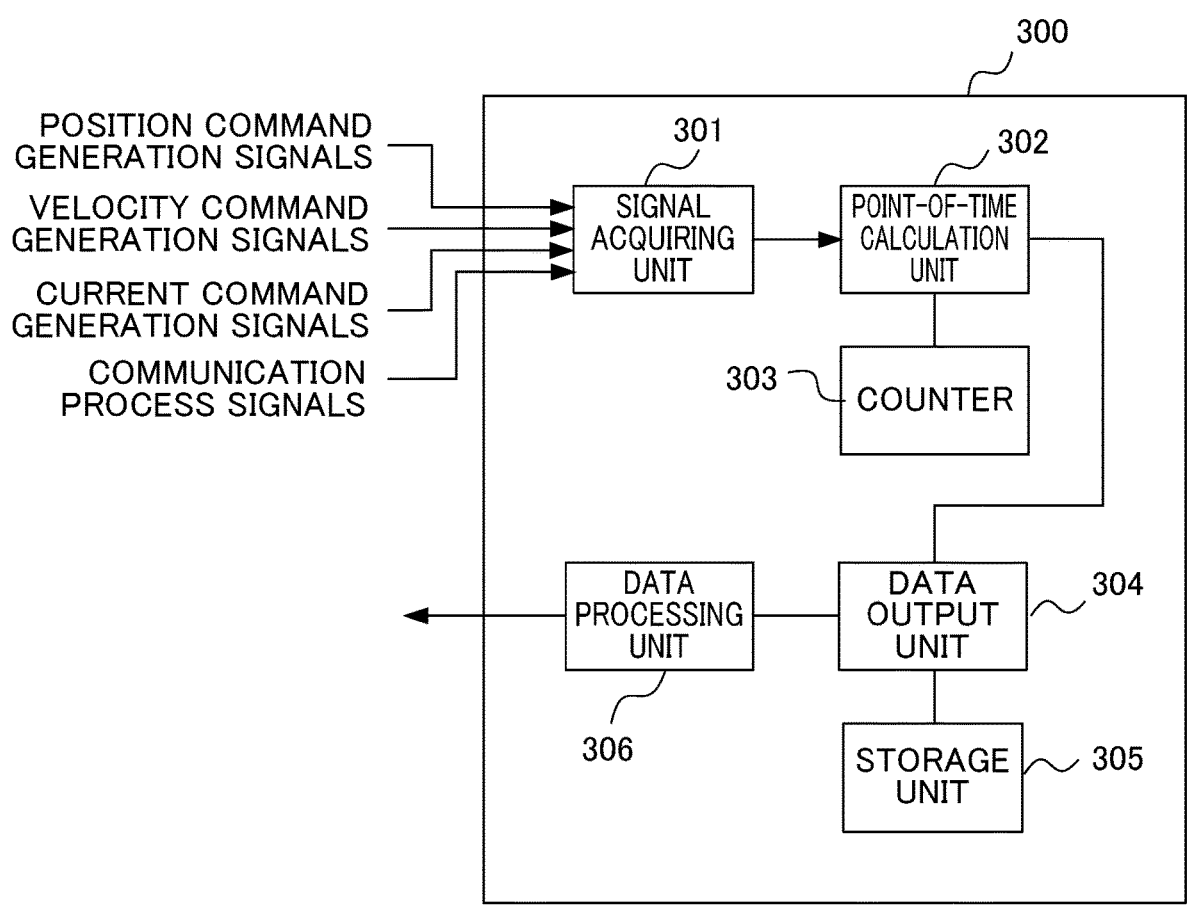
FIG. 4 is a block diagram showing a configuration example of an observation unit.

FIG. 4 is a block diagram showing a configuration example of the observation unit 300. As shown in FIG. 4, the observation unit 300 includes a signal acquiring unit 301, a point-of-time calculation unit 302, a counter 303, a data processor 304, a storage unit 305, and a data output unit 306. The signal acquiring unit 301 acquires, from the first arithmetic processing unit 100 and the second arithmetic processing unit 200, signals indicating the start and the end of each of the processes An, Bn, Cn, and Dn of the servo control shown in FIG. 3, for example. The signal indicating the start of the process changes from a low level to a high level at the start of the process, for example. The signal indicating the end of the process changes from a high level to a low level at the end of the process, for example. When the process An is the process of generating the current command, the signal acquiring unit 301 acquires signals (denoted as CURRENT COMMAND GENERATION SIGNALS in FIG. 4) indicating the start and the end of the generation of the current command, from the velocity control unit 106. When the process Bn is the process of generating the velocity command, the signal acquiring unit 301 acquires signals (denoted as VELOCITY COMMAND GENERATION SIGNALS in FIG. 4) indicating the start and the end of the generation of the velocity command, from the position control unit 103. When the process Cn is the process of generating the position command, the signal acquiring unit 301 acquires signals (denoted as POSITION COMMAND GENERATION SIGNALS in FIG. 4) indicating the start and the end of the generation of the position command, from the position command generation unit 101. When the process Dn is the process of communicating with the numerical control device 20, the signal acquiring unit 301 acquires signals (denoted as COMMUNICATION PROCESS SIGNALS in FIG. 4) that indicate the start and the end of the communication, from a communication unit (not shown) of the first arithmetic processing unit 100. The signal acquiring unit 301 outputs the acquired signals to the point-of-time calculation unit 302 in each of the foregoing cases.

Based on the signals indicating the start and the end of the processes, the point-of-time calculation unit 302 determines the points-of-time at which each process starts and ends, using a counter 303 that counts up in increments of a predetermined time period, and thereby outputs count values in association with the processes An, Bn, Cn and Dn to the data processor 304.

The data processor 304 stores a count value at the time of reception of the signal indicating the start of the process A1, associates the count value with the point of time (e.g., point of time "x0.00"), and stores, in a table of the storage unit 305, the point of time in connection with the start of the process A1. The data processor 304 performs a conversion from a count value at the time of reception of a signal indicating the end of the process A1 or a signal indicating the start of the next process B1, and thereby determines a point of time (e.g., point of time "x0.30") at which the process A1 ends. The point of time at which the process A1 ends can be determined by the conversion of the count value at the time of reception of the signal indicating the start of the next process B1 because the process A1 ends at the same point of time as the start of the process B1, as shown in FIG. 3. Once the process A1 starts, a signal indicating the end of a process and a signal indicating the start of the next process are received at the same point of time. Thus, after the start of the process A1, it is suitable to determine the points of time of the reception of signals indicating the start of the processes or the points of time of the reception of signals indicating the end of the processes. The data processor 304 determines the points of time of the start and end of the process B1 and those of the subsequent processes from the respective count values in the same manner, and stores the determined points of time in connection with the start of the process A1, in the table of the storage unit 305. The storage unit 305 stores the table in which the thus obtained point-of-time information about the start and end is associated with the types of the processes An, Bn, Cn and Dn.

Figure 5:
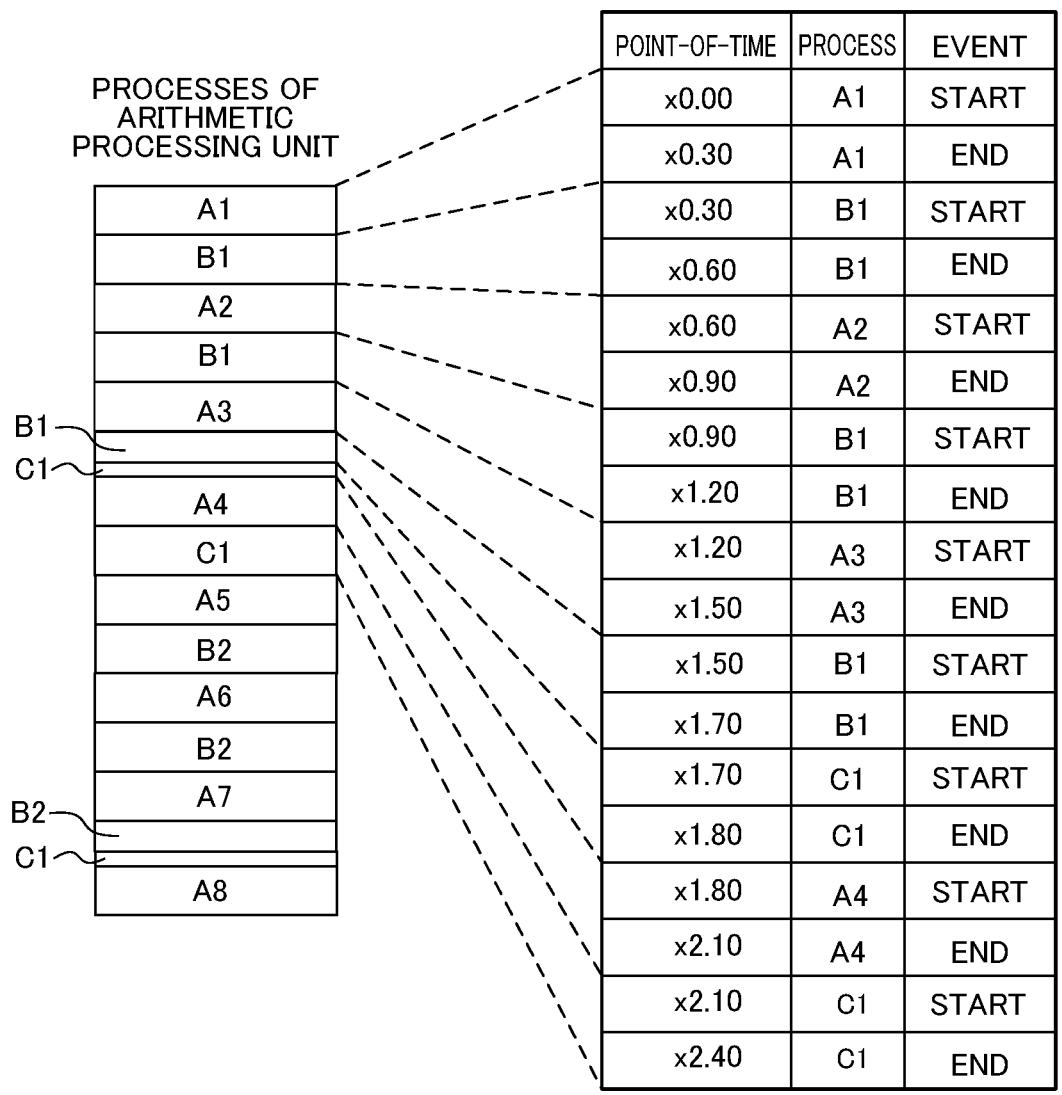
FIG. 5 shows the contents of a table of a storage unit that correspond to the details of processes executed by the arithmetic processing unit.

FIG. 5 shows the contents of the table of the storage unit 305 that correspond to the details of the processes executed by the first arithmetic processing unit 100. In FIG. 5, the start and the end of the processes from the process A1 to a portion of the process C1 are listed, and the table shows the points of time of the start and the end. The data processor 304 outputs the data of the table stored in the storage unit 305 to the data output unit 306. The timing at which the data of the table is outputted to the data output unit 306 is not particularly limited. For example, the data processor 304 can output the data of the table upon obtaining the data of the table in the control cycle $T_B$ from the process A1 to the portion of the process C1 shown in FIG. 5 such that the screen shown in FIG. 7 to be described later is displayed.

<Output Unit 400>

Figure 6:
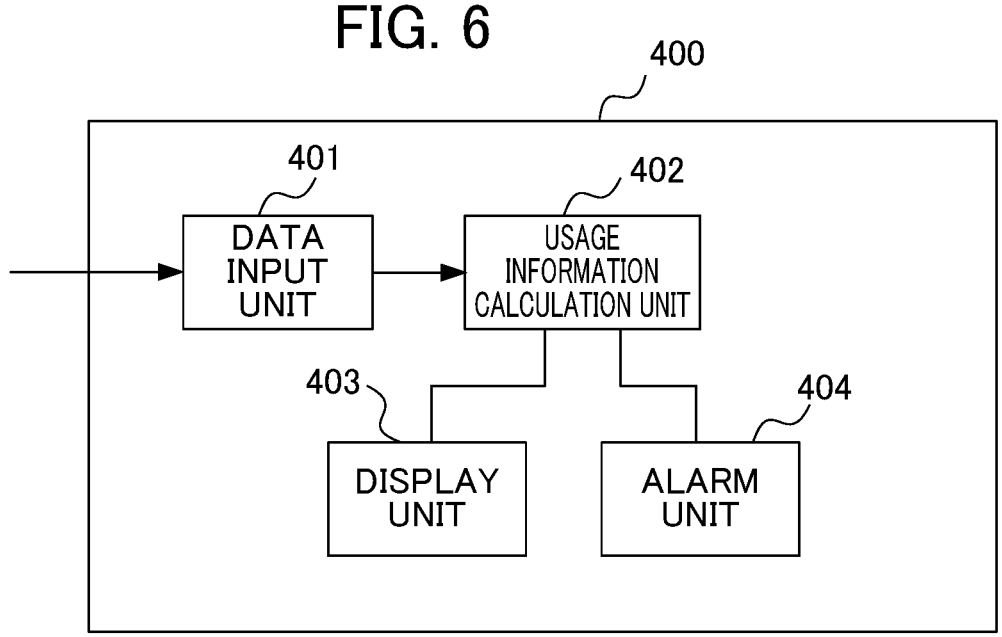
FIG. 6 is a block diagram showing a configuration example of an output unit.

FIG. 6 is a block diagram showing a configuration example of the output unit 400. As shown in FIG. 6, the output unit 400 includes a data input unit 401, a usage information calculation unit 402, a display unit 403, and an alarm unit 404. The data input unit 401 receives, from the data output unit 306 of the observation unit 300, data relating to the start and the end of the processes and data relating to the points of time of the start and the end, and outputs them to the usage information calculation unit 402. The usage information calculation unit 402 calculates the information (usage information) relating to the usage of the first arithmetic processing unit 100 by the processes. For example, the usage information calculation unit 402 calculates, from the points of time of the start and the end of the processes A1 to A4, the process B1, and the process C1, the time periods T during which the processes A1 to A4, the process B1, and the process C1 are executed. The usage information calculation unit 402 then creates screen information such that the display unit 403 displays information including the processing time periods T during which the processes are executed. The usage information calculation unit 402 outputs the created screen information to the display unit 403.

Figure 7:
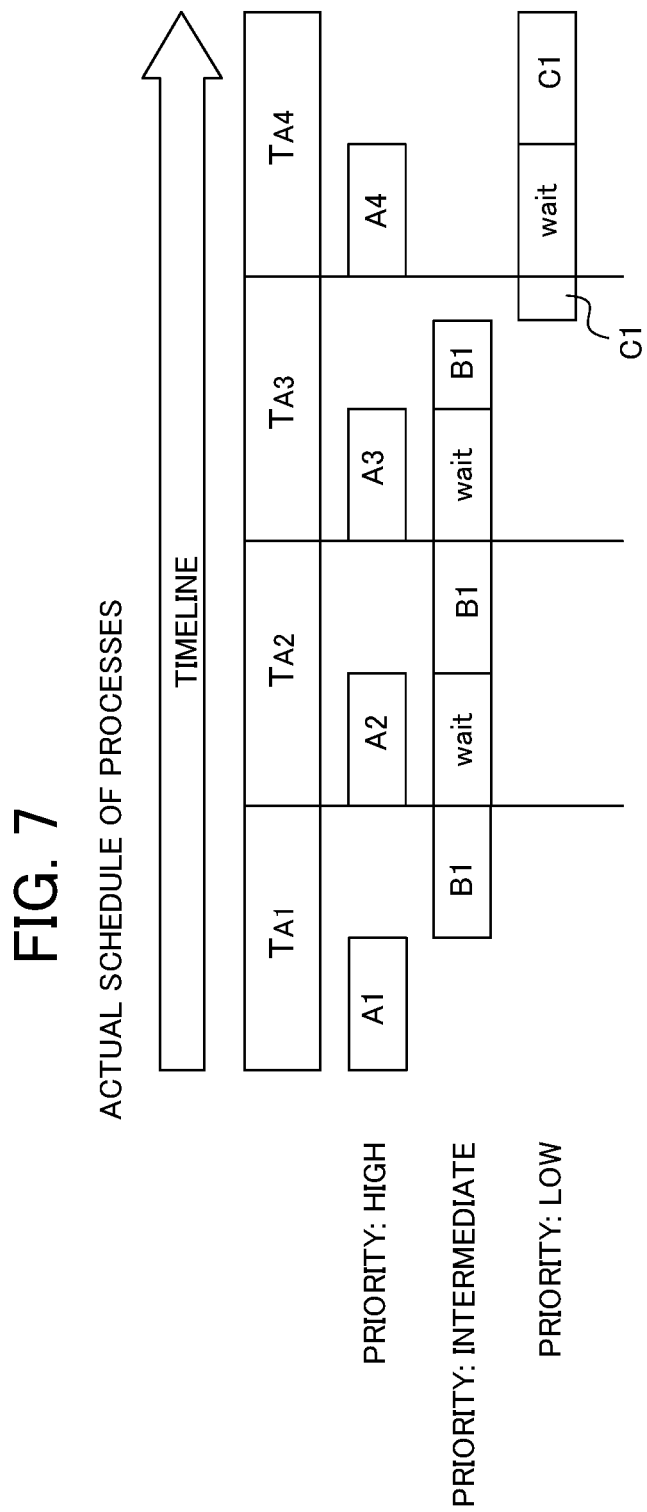
FIG. 7 is a diagram showing an example of a screen displayed by a display unit based on screen information.

FIG. 7 shows an example of a screen displayed on the display unit 403 based on the screen information. FIG. 7 shows, as the usage information, the time periods during which the processes A1 to A4, the process B1, and the process C1 are executed in the control cycles $T_{A1}$ to $T_{A4}$ of the processes An, along the timeline. The screen of FIG. 7 shows the order of priority of the processes, as processes An>processes Bn>processes Cn. In the screen of FIG. 7, "wait" indicates waiting time due to an interrupt. With reference to the screen of FIG. 7, a user can find out the timing of the processes A1 to A4, the process B1, and the process C1. The user understands that the processes A1 to A3 have priority in being executed over the process B1, and the process C1 is executed when the process B1 ends, while the process A4 has priority in being executed over the process C1. Further, the user can recognize the timing of suspension of the processes B1 and C1 due to interrupts thereto and the timing of restart of the processes B1 and C1. Although not all the processes An, Bn, Cn, and Dn are shown in FIG. 7, all the processes are displayed on the display unit 403, if necessary. That is, part or all of the processes An, Bn, Cn, and Dn are displayed on display unit 403 as necessary.

The usage information calculation unit 402 sends an alarm instruction to the alarm unit 404 when the processing time period T during which the processes are executed approaches the given processing time period T0. The alarm unit 404 issues an alarm by emitting an alarm sound, or causing an increased number of LED elements of an LED array to emit light. The alarm may be issued by way of alarm information displayed on the display unit 403, or a combination of the alarm information on the display unit 403 and an alarm sound emitted from a speaker of the display unit 403. In the case where the display unit 403 issues the alarm, the alarm unit 404 may be omitted. The alarm may be issued at an arbitrarily set timing, provided that the processing time period T during which the processes are executed is shorter than the given processing time period T0 at that timing. For example, while a time period T1 serving as a reference for issuing the alarm is set as T1=0.9×T0, when the processing time period T during which the processes are executed exceeds a value given by 0.9×T0, the alarm instruction corresponding to a shortage of processing time period can be outputted.

Although FIG. 7 shows the usage information of the first arithmetic processing unit 100, usage information of the second arithmetic processing unit 200 may be displayed at the same time. Alternatively, it is conceivable to display switching buttons on the screen so that the user can switch the display between a screen displaying the usage information of the first arithmetic processing unit 100 and a screen displaying the usage information of the second arithmetic processing unit 200 by selecting one of the switching buttons. When the usage information is constituted by the usage ratio T/T0 of the processing time period, the usage information calculation unit 402 may display the usage ratios of the arithmetic processing units on a unit-to-unit basis, as shown in FIG. 8.

Figure 8:
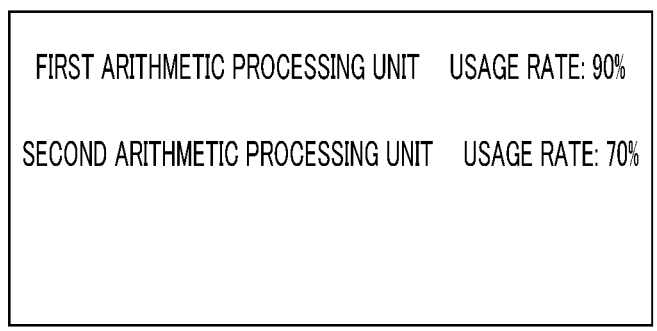
FIG. 8 is a diagram showing an example of a screen in which usage ratios of arithmetic processing units are indicated on a unit-to-unit basis.

The usage information calculation unit 402 may use the communication unit to output image information relating to the screen shown in FIG. 7 or 8 to an external device via, for example, the Internet or a dedicated communication line.

The display unit 403 and/or the alarm unit 404 may be provided separately from the servo control device 10. For example, the display unit 403 and/or the alarm unit 404 may be provided at a terminal capable of communicating with the servo control device 10.

According to the servo control device of the present embodiment, the user can grasp the load on the arithmetic processing units from the usage information. As a result, the user can stop an excessive function of the arithmetic processing unit by a known technique, or can transfer part of the arithmetic processes to another arithmetic processing unit with a small load, thereby improving the stability and efficiency of the servo control device. For example, in a case where one arithmetic processing unit sequentially performs control operations in relation to a plurality of motors, the possibility that the operations fail to be completed increases with increase in the number of the motors to be processed. The amount of the operations is reduced by transferring the control of some of the motors to another arithmetic processing unit.

Since real-time performance is required, it is generally desirable for a servo control device to assign priorities to processing tasks. The servo control device of the present embodiment can schedule the processing tasks such that a processing task with high priority causes an interrupt to another processing task so as to be executed.

In a case where functions (a feedback function, a feedforward function, etc.) are combined for use in a servo control device, it is necessary to estimate a processing capability required for the servo control device. In the same case, according to the servo control device of the present embodiment, a processing margin of the currently-used arithmetic processing device can be grasped, making it easy to estimate the processing capacity of the arithmetic processing device when the combination of the functions is added. Further, even if addition of a process or a function due to maintenance or continuous development of the system results in an increase in the time period required for the processes, the servo control device of the present embodiment clearly shows the time period required for each of the processes and the relationship between the processes, thereby making schedule management easy and enabling an increase in the productivity.

In the foregoing, the functional blocks included in the servo control device 10 have been described. As described above, the arithmetic processing unit is constituted by, for example, a digital signal processor (DSP), a micro processing unit (MPU), a computing unit of another type, or a combination of an MPU and a DSP. In order to implement the observation unit or the output unit, the servo control device 10 includes an arithmetic processing device such as a central processing unit (CPU). Further, the servo control device 10 also includes an auxiliary storage device such as a hard disk drive (HDD) that stores various control programs including application software and an operating system (OS), and a main storage device such as a random access memory (RAM) that stores data temporarily required for the arithmetic processing unit to execute a program.

In the servo control device 10, the arithmetic processing device reads the application software and the OS from the auxiliary storage device, and executes arithmetic processes based on the read application software and the read OS while expanding the read application software and the read OS to the main storage device. Further, based on the arithmetic results, the various types of hardware provided in each device are controlled. In this way, the functional blocks of the present embodiment are implemented. In other words, the present embodiment can be implemented by way of cooperation of the hardware and the software.

If the amount of arithmetic computation is large in the observation unit or the output unit of the servo control device 10, for example, graphics processing units (GPUs) are incorporated in a personal computer, and are used for the arithmetic processes by a technique called general-purpose computing on graphics processing units (GPGPU). In this way, the processes are suitably executed at a high speed. Further, for faster processing, a computer cluster may be constructed which includes a plurality of computers equipped with the GPUs so that parallel processing may be executed by the plurality of computers included in the computer cluster.

The components included in the above-described servo control device can be implemented using hardware, software, or a combination thereof. In addition, a servo control method performed by way of the cooperation of the components included in the above-described servo control device can also be implemented using hardware, software, or a combination thereof. Here, "implemented using software" means implementation by a computer reading and executing programs.

Program can be stored in various types of non-transitory computer readable mediums, and can be supplied to the computer. Non-transitory computer readable mediums include various types of substantive recording mediums (tangible storage mediums). Examples of the non-transitory computer readable mediums include a magnetic recording medium (e.g., a hard disk drive), a magnetic-optical recording medium (e.g., a magnetic-optical disk), a read only memory (CD-ROM), a CD-R, a CD-R/W, a semiconductor memory (e.g., a mask ROM, a programmable ROM (PROM), an erasable PROM (EPROM), a flash ROM, a random access memory (RAM)).

The above-described embodiment is a preferred embodiment of the present invention. However, it is not intended to limit the scope of the present invention only to the above-described embodiment. The present invention can be implemented in such a manner that various modifications are made without departing from the spirit of the present invention.

<Modification with Output Unit Provided Outside Servo Control Device>

Figure 9:
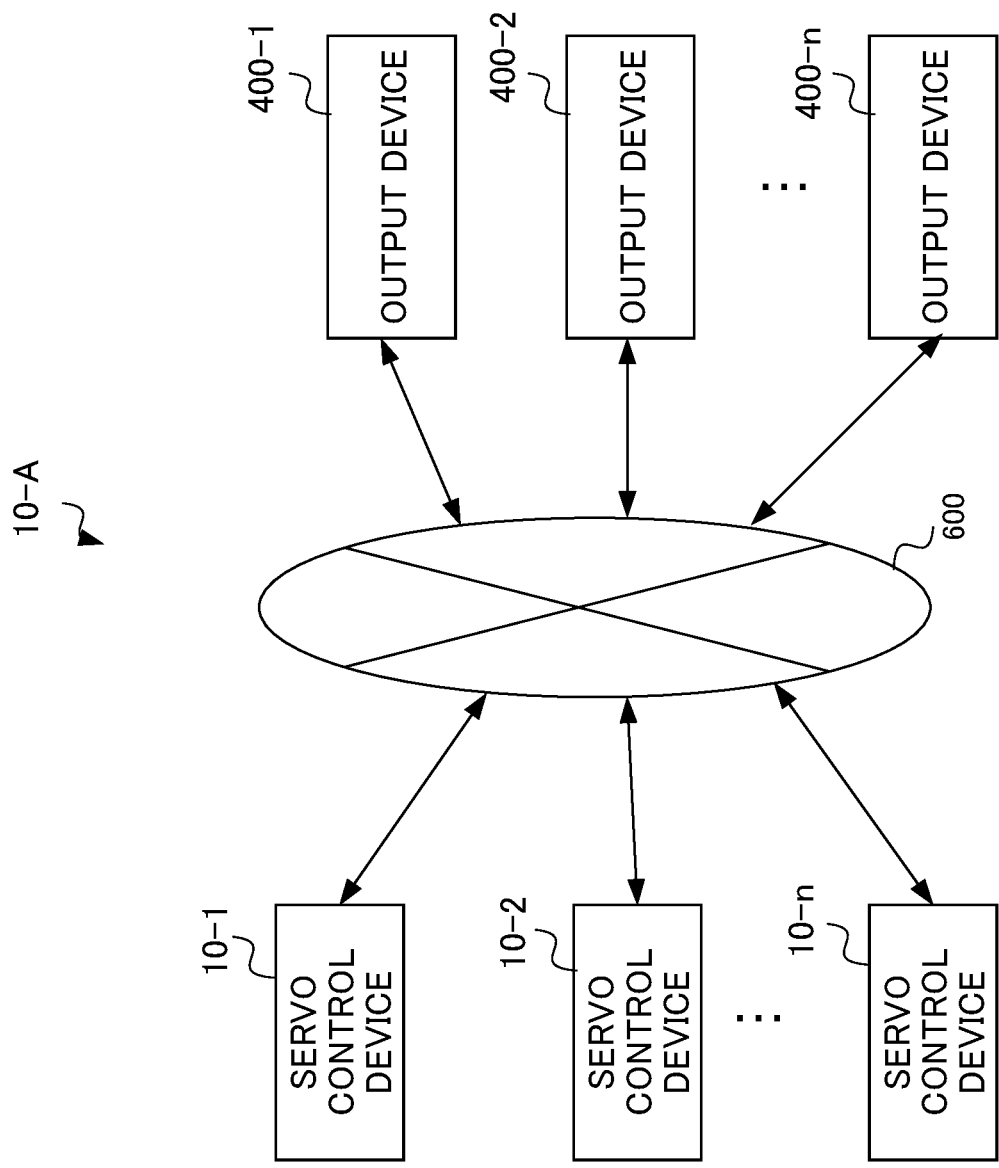
FIG. 9 is a block diagram showing a servo control system in which output units are provided outside servo control devices.

As the present modification, an example in which the output unit is provided independently from the servo control device will be described. In the present modification, the output unit, which is provided independently from the servo control device, is referred to as the output device. FIG. 9 is a block diagram showing a servo control system in which output units are provided outside servo control devices.

The servo control system 10A shown in FIG. 9 includes n (where n is a natural number equal to or larger than 2) servo control devices 10-1 to 10-$n$, n output devices 400-1 to 400-$n$, and a network 600 via which the n servo control devices 10-1 to 10-$n$ are connected to the n output devices 400-1 to 400-$n$. Although the servo control devices 10-1 to 10-$n$ are each connected to a numerical control device, the numerical control devices are omitted from FIG. 9. Each of the servo control devices 10-1 to 10-$n$ has the same configuration as that of the servo control device 10 shown in FIG. 1, except that the servo control devices 10-1 to 10-$n$ include no output unit. The output devices 400-1 to 400-$n$ have the same configuration as that of the output unit 400 shown in FIG. 6.

Here, the servo control device 10-1 and the output device 400-1 forms a pair on a one-to-one basis, and are communicatively connected to each other. The servo control devices 10-2 to 10-$n$ are also connected to the output device 400-2 to 400-$n$, respectively, in the same manner as of the servo control device 10-1 and the output device 400-1. In FIG. 9, in each of the n pairs of the servo control devices 10-1 to 10-$n$ and the output devices 400-1 to 400-$n$, the connection is established via the network 600. Alternatively, in each of the n pairs of the servo control devices 10-1 to 10-$n$ and the output devices 400-1 to 400-$n$, the servo control device and the output device may be directly connected to each other via a connection interface. For example, two or more pairs of these n pairs of the servo control devices 10-1 to 10-$n$ and the output devices 400-1 to 400-$n$ may be installed in the same factory. Alternatively, the n pairs may be installed in different factories.

The network 600 is, for example, a local area network (LAN) constructed in a factory, the Internet, a public telephone network, or a combination thereof. The network 600 is not particularly limited in terms of specific communication scheme, a mode of connection (wire connection or wireless connection), etc.

<Degree of Freedom of System Configuration>

In the above-described embodiment, each of the servo control devices 10-1 to 10-$n$ and the associated one of the output devices 400-1 to 400-$n$ forms a pair on a one-to-one basis and communicatively connected to each other. Alternatively, one output device may be communicatively connected to a plurality of servo control devices via the network 600, and may output the usage information of the arithmetic processing units of the plurality of servo control devices so that the user can grasp the loads on the arithmetic processing units. In that case, a distributed processing system may be employed in which the functions of the one output device are distributed to a plurality of servers as appropriate. Alternatively, the functions of the one output device may be implemented by using a virtual server function or the like on a cloud.

The servo control device, the servo control system, and the servo control method according to the present disclosure include various embodiments having the following features, in addition to the embodiment described above.

(1) A first aspect of the present disclosure is directed to a servo control device (e.g., the servo control device 10) including: an arithmetic processing unit (e.g., the arithmetic processing unit 100, 200) that executes a plurality of processes related to servo control processing; an observation unit (e.g., the observation unit 300) that determines at least one of point-of-time information about start of each of the processes executed by the arithmetic processing unit or point-of-time information about end of each of the processes executed by the arithmetic processing unit; and an output unit (e.g., the output unit 400) that calculates information about usage of the arithmetic processing unit based on the point-of-time information determined by the observation unit, and outputs the calculated information. The servo control device enables the user to grasp a state of load on the arithmetic processing unit so that the user can stop an excessive function of the arithmetic processing unit, or can transfer part of the arithmetic processes to another arithmetic processing unit with a small load, whereby the stability and efficiency of the servo control device can be improved.

(2) In the servo control device according to (1) above, the information about the usage is constituted by a processing time period during which the processes are executed by the arithmetic processing unit, a difference between a given processing time period and the processing time period during which the processes are executed, a ratio of the processing time period during which the processes are executed to the given processing time period, or a ratio of the difference to the given processing time period.

(3) In the servo control device according to (1) or (2) above, the output unit includes a display unit (e.g., the display unit 403), and the display unit displays the usage of the arithmetic processing unit.

(4) In the servo control device according to any one of (1) to (3) above, the output unit includes a display unit (e.g., the display unit 403), and the display unit displays processing time periods of at least part of the plurality of processes on a process-by-process basis, and a positional relationship in terms of time between the processes, along a timeline.

(5) In the servo control device according to (3) or (4) above, the output unit displays alarm information on the display unit when the processing time period during which the processes are executed exceeds a time period serving as a reference for issuance of the alarm.

(6) In the servo control device according to any one of (1) to (4) above, the output unit includes an alarm unit (e.g., the alarm unit 404), and the alarm unit issues an alarm when the processing time period during which the processes are executed exceeds a time period serving as a reference for issuance of the alarm.

(7) A second aspect of the present disclosure is directed to a servo control system including: servo control devices (e.g., the servo control devices 10-1 to 10-*n*) each including an arithmetic processing unit (e.g., the arithmetic processing unit 100, 200) that executes a plurality of processes related to servo control processing, and an observation unit (e.g., the observation unit 300) that determines at least one of point-of-time information about start of each of the processes executed by the arithmetic processing unit or point-of-time information about end of each of the processes executed by the arithmetic processing unit; and output devices (e.g., the output devices 400-1 to 400-*n*) each calculating information about usage of the arithmetic processing unit based on the point-of-time information determined by the observation unit, and each outputting the calculated information. The servo control system enables the user to grasp a state of load on the arithmetic processing units, so that the user can stop an excessive function of the arithmetic processing unit, or can transfer part of the arithmetic processes from one arithmetic processing unit to another with a small load, whereby the stability and efficiency of the servo control system can be improved.

(8) A third aspect of the present disclosure is directed to a servo control method of servo control devices (e.g., the servo control devices 10-1 to 10-*n*) each including an arithmetic processing unit (e.g., arithmetic processing unit 100, 200) that executes a plurality of processes related to servo control processing, the servo control method including: determining at least one of point-of-time information about start of each of the plurality of processes or point-of-time information about end of each of the plurality of processes; calculating information about usage of the arithmetic processing unit based on the determined point-of-time information; and outputting the calculated information. This servo control method enables a user to grasp a state of load on the arithmetic processing units so that the user can stop an excessive function of the arithmetic processing unit, or can transfer part of the arithmetic processes from one arithmetic processing unit to another with a small load, whereby the stability and efficiency of the servo control devices can be improved.

EXPLANATION OF REFERENCE NUMERALS

10, 10-1 to 10-*n*: Servo Control Device
20: Numerical Control Device
100, 200: Arithmetic Processing Unit
101: Position Command Generation Unit
102: Subtractor
103: Position Control Unit
104: Adder
105: Subtractor
106: Velocity Control Unit
107: Adder
108: Integrator
109: Position Feedforward Unit
110: Velocity Feedforward Unit
300: Observation Unit
400: Output Unit
400-1 to 400-*n*: Output Device
500: Servo Motor
501: Rotary Encoder
600: Network

What is claimed is:

1. A servo control device comprising:
a memory configured to store a program; and
at least one processor configured to execute the program and control the servo control device to function as:
an arithmetic processing unit that executes a plurality of processes related to servo control processing;
an observation unit that determines at least one of point-of-time information about start of each of the processes executed by the arithmetic processing unit or point-of-time information about end of each of the processes executed by the arithmetic processing unit; and
an output unit that calculates information about usage of the arithmetic processing unit based on the point-of-time information determined by the observation unit, and outputs the calculated information,
wherein the output unit includes an alarm unit, and the alarm unit issues an alarm when a processing time period during which the plurality of processes are executed exceeds a time period serving as a reference for issuance of the alarm.

2. The servo control device according to claim 1, wherein the information about the usage is constituted by a processing time period during which the processes are executed by the arithmetic processing unit, a difference between a given processing time period and the processing time period during which the processes are executed, a ratio of the processing time period during which the processes are executed to the given processing time period, or a ratio of the difference to the given processing time period.

3. The servo control device according to claim 1, wherein the output unit includes a display unit, and the display unit displays the usage of the arithmetic processing unit.

4. The servo control device according to claim 1, wherein the output unit includes a display unit, and the display unit displays processing time periods of at least part of the plurality of processes on a process-by-process basis, and a positional relationship in terms of time between the processes, along a timeline.

5. The servo control device according to claim 3, wherein the alarm unit causes alarm information to be displayed on the display unit when the processing time period during which the processes are executed exceeds the time period serving as the reference for issuance of the alarm.

6. A servo control system comprising:
servo control devices each including an arithmetic processing unit that executes a plurality of processes related to servo control processing, and an observation unit that determines at least one of point-of-time information about start of each of the processes executed by the arithmetic processing unit or point-of-time information about end of each of the processes executed by the arithmetic processing unit; and
output devices each calculating information about usage of the arithmetic processing unit based on the point-of-time information determined by the observation unit, and each outputting the calculated information about the usage,
wherein each of the output devices includes an alarm unit, and each of the alarm units issues an alarm when a processing time period during which the plurality of processes are executed exceeds a time period serving as a reference for issuance of the alarm.

7. A servo control method of servo control devices each including an arithmetic processing unit that executes a plurality of processes related to servo control processing, the servo control method comprising:
- determining at least one of point-of-time information about start of each of the plurality of processes or point-of-time information about end of each of the plurality of processes;
- calculating information about usage of the arithmetic processing unit based on the determined point-of-time information; and
- outputting the calculated information,
- wherein said outputting includes issuing an alarm when a processing time period during which the plurality of processes are executed exceeds a time period serving as a reference for issuance of the alarm.

* * * * *